(12) United States Patent
Nilsson et al.

(10) Patent No.: US 10,388,431 B2
(45) Date of Patent: Aug. 20, 2019

(54) METHOD FOR PREPARING AN HVDC ACCESSORY

(71) Applicant: NEXANS, Paris (FR)

(72) Inventors: Susanne Nilsson, Göteborg (SE);
Ramona Huuva, Torslanda (SE);
Staffan Josefsson, Göteborg (SE)

(73) Assignee: NEXANS, Courbevoie (FR)

( * ) Notice: Subject to any disclaimer, the term of this patent is extended or adjusted under 35 U.S.C. 154(b) by 291 days.

(21) Appl. No.: 15/389,836

(22) Filed: Dec. 23, 2016

(65) Prior Publication Data
US 2017/0236620 A1 Aug. 17, 2017

(30) Foreign Application Priority Data

Dec. 28, 2015 (EP) .................................... 15307152

(51) Int. Cl.
H01B 3/00 (2006.01)
H01B 9/00 (2006.01)
H01B 13/06 (2006.01)
H01B 13/14 (2006.01)
H02G 15/04 (2006.01)
H02G 15/18 (2006.01)
B29C 48/15 (2019.01)
B29C 35/02 (2006.01)
B29C 63/14 (2006.01)
H01B 3/44 (2006.01)
H01B 13/00 (2006.01)
B29L 31/34 (2006.01)

(52) U.S. Cl.
CPC ............ *H01B 9/006* (2013.01); *B29C 35/02* (2013.01); *B29C 48/15* (2019.02); *B29C 63/14* (2013.01); *H01B 3/002* (2013.01); *H01B 3/441* (2013.01); *H01B 13/0016* (2013.01);
*H01B 13/06* (2013.01); *H01B 13/14* (2013.01); *H02G 15/04* (2013.01); *H02G 15/046* (2013.01); *H02G 15/1813* (2013.01); *B29K 2995/0007* (2013.01); *B29L 2031/3462* (2013.01)

(58) Field of Classification Search
None
See application file for complete search history.

(56) References Cited

U.S. PATENT DOCUMENTS 8,398,803 B2 * 3/2013 Olsson .................. H01B 3/441
156/242
2010/0314022 A1 12/2010 Olsson
(Continued)

OTHER PUBLICATIONS

Search Report dated Jun. 13, 2016.

*Primary Examiner* — Barbara J Musser
(74) *Attorney, Agent, or Firm* — Sofer & Haroun, LLP

(57) ABSTRACT

A method for preparing an HVDC cable for jointing or termination includes the step of providing a section of an HVDC cable comprising a conductor surrounded by a first semiconducting layer, and at least one insulation layer of a first polymer material surrounding the first semiconducting layer, where the insulation layer comprises conductive volatile by-products. A tape of a second polymer material is provided, where the additional layer comprises conductive volatile by-products. The tape is lapped onto the insulation layer thereby forming an additional layer. Heat is applied to crosslink the additional layer and redistribute the conductive volatile by-products.

9 Claims, 2 Drawing Sheets

(56) References Cited

U.S. PATENT DOCUMENTS

2014/0182886 A1\* 7/2014 Sonerud .................. C09J 7/20
                                                        174/120 SC
2015/0318675 A1   11/2015 Olsson \* cited by examiner

METHOD FOR PREPARING AN HVDC ACCESSORY

RELATED APPLICATION

This application claims the benefit of priority from European Patent Application No. 15 307 152.7, filed on Dec. 28, 2015, the entirety of which is incorporated by reference.

BACKGROUND

Field of the Invention

The present invention relates to a method for preparing high voltage direct current (HVDC) cable sections and accessories.

Discussion of Related Art

It is well known that accessories in a cable system, such as joints and terminations, form discontinuities in the outer screen. As the cables' concentric geometry is disrupted this allows for electric field enhancement that may be strong enough to break down the insulation at this area. Electrical breakdowns, when a cable system is subjected to DC fields and elevated temperatures tend to appear in the outer periphery of the cable insulation due to the field inversion which inverts the peak field from the inner periphery of the cable insulation.

At high voltages these effects are even more demanding on the insulation.

The term high voltage refers to voltages of above 45 kV and ranging up to 800 kV.

An HVDC cable comprises at least an electrical conductor surrounded by at least one first semiconducting layer, an electrically insulating layer surrounding the first semiconducting layer and a second semiconducting layer surrounding the insulating layer, optionally one or more further layers surround the second semiconducting layer. When an end of an HVDC cable is prepared for termination or jointing with another cable the one or more further layers and the second semiconducting layer is removed from an end section of the cable to provide for termination and/or jointing of the different elements of the cable. It is especially within this end section no longer surrounded by a second semiconducting layer that electrical breakdowns have been observed.

PRIOR ART

From U.S. Pat. No. 8,398,803 an extruded polymer based insulation system covered by a cover impermeable to one or more substances present in the extruded insulation system in a non-homogenous distribution is known. The covered extruded HVDC cable is exposed to a heat treatment procedure in order to equalize the concentration of the one or more substances in the extruded insulation system. The disclosed method achieves redistribution depending on the amount of conductive volatile compounds already present in the cable. This redistribution can be difficult to achieve if the amount of conductive volatile compounds is low.

WO2013182829 discloses a tape containing an amount of linear filler. The tape is lapped on accessories and used as a space charge trapping layer. The tape is arranged in contact with the insulation layer of a cable or fitting replacing part of an outer (second) semi conducting layer. The tape is based on a complex material.

There is still a need for improvement of the electrical durability of accessories and alternative and possibly simpler ways of obtaining said durability.

OBJECTIVES OF THE INVENTION

It is the objective of the present invention to provide a method for increasing the dielectric strength in the insulation system of HVDC accessories.

It is further an objective to provide a method and system with good compatibility.

The invention aims at providing an alternative solution which minimizes or reduces the probability of an electrical breakdown originating from the outer periphery of the cable insulation system due to direct current (DC) field distributions, and which solution is flexible with regards to the amount of available volatile compounds in the cable insulation system.

The present invention provides a method for preparing an HVDC cable for jointing or termination comprising:

providing a section of an HVDC cable comprising a conductor surrounded by a first semiconducting layer, and at least one insulation layer of a first polymer material surrounding the first semiconducting layer, wherein the insulation layer comprises conductive volatile by-products, providing a tape of a second polymer material, wherein the additional layer comprises conductive volatile by-products, lapping the tape onto the insulation layer thereby forming an additional layer, applying heat to crosslink the additional layer and redistribute the conductive volatile by-products. In one aspect of the method the concentration of conductive volatile compounds in the radial direction of the at least one insulation layer and the at least one additional layer is equalized providing a smooth byproduct profile.

In a further aspect of the method, after heat has been applied, the morphology of the additional layer is different from the morphology of the insulation layer.

In one aspect of the method the at least one insulation layer is extruded onto the first semi-conducting layer.

In a further aspect of the method the additional layer comprises a higher concentration of conductive volatile by-products than the at least one insulation layer.

This invention describes a method to increase the dielectric strength in the outer periphery of a cable insulation system.

In one embodiment of the present solution the same polymer material as used in the insulation layer is also used to prepare the tape for the additional layer. This secures compatibility between the two layers.

It is believed that a possible reason for the obtained improvement in voltage withstand strength can come from the change in insulation morphology due to the process of crosslinking a tape lapped around the extruded insulation layer. In the extruded layer the molecules are oriented randomly possibly with some increased orientation in the longitudinal direction in the direction of extrusion. An extruded tape may initially have a similar morphology, but as the tape is lapped around the insulation layer a spiral arrangement is obtained. The crosslinking of the tape layer will further influence the morphology of the tape layer. The different morphology of the tape layer compared to the extruded layer is believed to provide a reinforced dielectric interface in the peripheral region.

The method according to the present invention comprises:

providing a section of an HVDC cable comprising a conductor surrounded by a first semiconducting layer, and an extruded insulation layer of a first polymer material surrounding the first semiconducting layer, providing a tape of a second polymer material,
   lapping the tape onto the extruded insulation layer thereby forming an additional layer,
   applying heat to melt, fuse and/or crosslink the additional layer.

The lapping of the tape onto the insulation layer of the HVDC cable is continued until the desired thickness is obtained over the section of the HVDC cable in need of improved increased dielectric strength.

The first polymer material and the second polymer material may comprise the same or similar type of conductive volatile compounds. The first and second polymer material can be the same type of polymer material, preferably selected from the group comprising polyethylene (PE), low density polyethylene (LDPE), crosslinked polyethylene (XLPE), polypropylene, and poly(methyl meth-acrylate) (PMMA). The term "same type of polymer material" refers to the being of the same type when selected from the above group. In a further embodiment the first and second polymer material may be identical, which means that the materials are not only of the same type but also contains the same additives such as cross linking agents, anti oxidants etc.

Any type of cross linking agent may be used in the tape to facilitate the cross linkage of the tape during the heat treatment, examples of applicable cross linking agents include but are not limited to organic peroxides more specific dialkyl peroxides such as dicumyl peroxide (DCP), t-butyl cumyl peroxide, di-tert-butylperoxy-isopropyl)benzene and di-tert-butyl peroxide. In a preferred embodiment the same type of cross linking agent is used in the tape and the extruded insulation.

The idea renders possible the use of an additional layer with a different morphology on top of the extruded cable.

One purpose of the heating step is to achieve cross linkage within and between the tape layers. The heating may also result in cross linkage of the tape to the extruded insulation. The heating temperature should accordingly be selected to secure a temperature in the tape layer above the cross linking temperature, so that this objective is obtained.

The DC electrical field in a cable is dependent on the conductivity profile and for extruded HVDC cables an even radial distribution of conductive volatile compounds in the insulation system is desirable. By lapping an additional layer of insulation containing same or similar type of conductive volatile compounds the radial distribution of conductive volatile compounds can be adjusted and influenced in a positive direction.

The present invention provides a large flexibility with regards to the amount of available volatile compounds in the cable insulation system. The additional layer may comprise the same or a different amount of conductive volatile compounds than the extruded insulation.

According to the present invention a "beneficial distribution" of conductive volatile compounds is a distribution wherein the conductive volatile compounds are evenly distributed in the radial direction through the insulation layer and the additional tape layer after the cable section has been subjected to heat treatment. A method of measuring the distribution of the volatile compounds is to take samples from the insulation layers at different radial positions and perform a high performance liquid chromatography (HPLC) analysis of each sample measuring the amount of the volatile compounds in each of the samples. By lapping an insulation material on top of the cable end section followed by a heating process, a more beneficial distribution of the conductive volatile compounds can be obtained. A morphology change also takes place as the lapped layer has different orientation and polymer structure than the extruded cable. This is believed to reduce the electrical field at the outer layers of the insulation system.

The term "tape" as used herein refers to a flat band of material which can be applied to a cable or other device by lapping or winding the band onto the surface of the cable or other device.

The term "conductive volatile compounds" and "conductive volatile by-product" as used herein refers to compounds that have a higher conductivity than the matrix polymer and that are volatile at relevant temperatures. When DCP is used as cross linking agent conductive volatile compounds comprise compounds such as alpha methyl styrene (AMS), cumyl-alcohol, aceto-phenone. The conductive volatile compounds are part of the initial polymer insulation material to be extruded or formed into a tape as well as compounds/by-products formed by the polymerisation or vulcanization of the material. The volatile compounds are small molecules compared to the polymer forming the insulation layer and they may be volatile at temperatures in the range 10-90° C. but also conductive compounds that are volatile at higher temperatures may be relevant to the properties of the cable and to the present invention.

The conductivity of some conductive volatile compounds is discussed for instance in the PhD thesis of Nuriziani Hussin, (2011) "The Effects of Crosslinking Byproducts on the Electrical Properties of Low Density Polyethylene", UNIVETRSITY OF SOUTHAMPTON, Faculty of Physics and Applied Sciences, School of Electronics and Computer Science. The volatile compounds were found to significantly more conductive than crosslinked polyethylene.

In one understanding the conductivity of the volatile compounds is above 1.0E–10 S/m, normally between 1.0E–9 S/m and 1.0E–3 S/m.

Other features and advantages with the solutions according to the present invention will be described with references to the enclosed drawings and examples.

DETAILED DESCRIPTION OF THE INVENTION

Figure 1A:
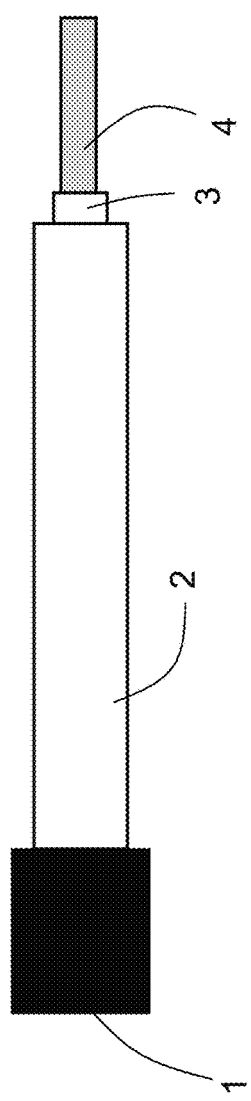
FIG. 1a illustrates schematically a cable termination prior to performing a method according to the invention.
Figure 1B:
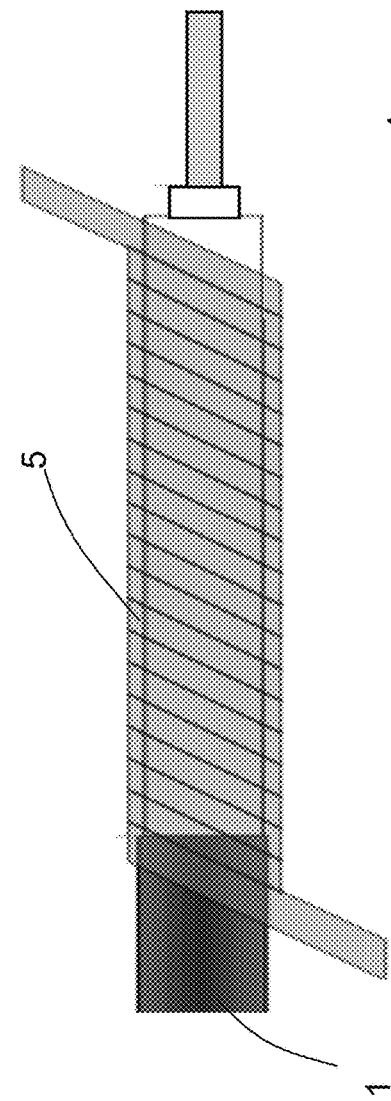
FIG. 1b illustrates schematically the cable termination after the lapping step.
Figure 1C:
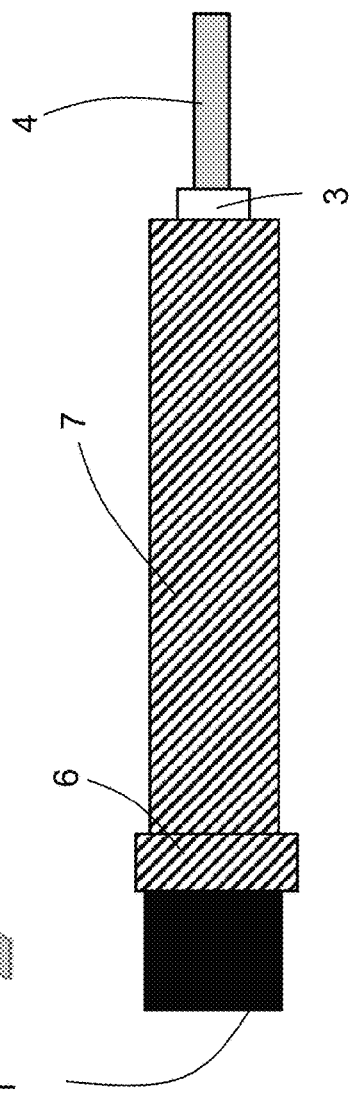
FIG. 1c illustrates schematically a cable termination according to the invention after the method of the invention has been completed.

An embodiment of the invention will now be described in further detail with reference to the enclosed drawings. FIG. 1a illustrates schematically a cable end section including a central conductor 4 surrounded by an inner semiconducting layer 3 which is radially surrounded by an insulation layer 2. An outer or second semi conducting layer 1 radially surrounds the insulation layer 2. To prepare the cable for jointing and/or termination the outer semi conducting layer has been removed from a section of the insulation layer 2. FIG. 1b illustrates a tape layer 5 that has been lapped around the exposed section of the insulation layer 2 thereby providing an additional layer according to the present invention. FIG. 1c illustrates the cable after the method according to the present invention has been completed and the tape layer 5 has been crosslinked and forms a layer 7 with a different morphology than the insulation layer 2. The heating results in cross linkage but also influences the distribution of the conductive volatile compounds both in the insulation layer and in the additional layer. Without being bound by this theory it is believed that the heating allows for redistribution of the conductive volatile compounds and thereby results in equalised concentration thereof in the radial direction from the inner semi-conducting layer through the insulation layer and the additional layer.

In the embodiment illustrated in FIG. 1c a section 6 of the additional layer overlaps the outer (second) semiconducting layer 1. Alternatively the tape layer 5 could be arranged to abut the second semi-conducting layer.

In a further embodiment (not shown) the outer semi-conducting layer has been fully removed from the relevant section of the cable.

EXAMPLES

A cable with a termination according to the present invention was successfully tested electrically using the type testing routines in the recommendation of Cigrè TB496 within the voltage range 40-800 kV. The solution according to the present invention provided a significant improvement of the cable system.

Following the type test the cable system was submitted to further impulse testing, enduring impressive voltages.

Figure 2:
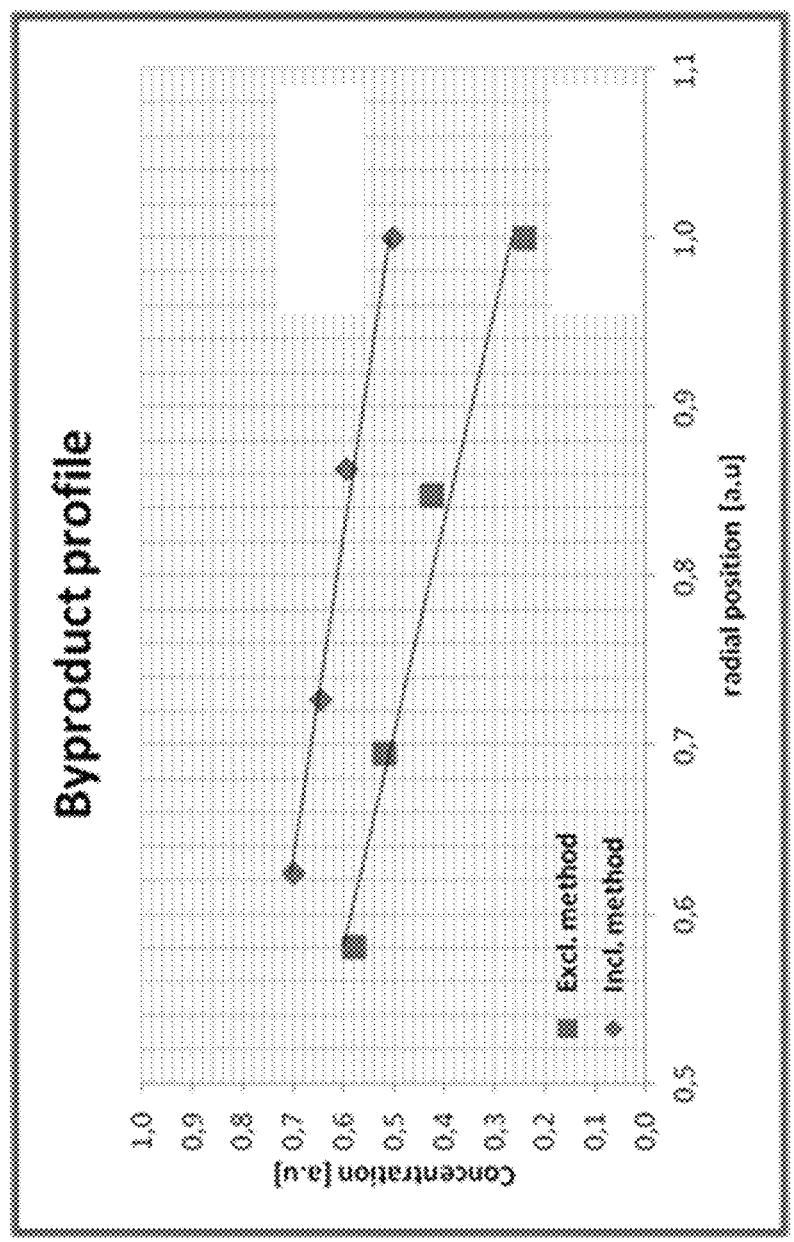
FIG. 2 illustrates the by-product profile before and after having performed the process according to the present invention.

Results on the by-product profile of a cable according to the present invention compared to before performing the present invention is shown on FIG. 2.

The figure shows the byproduct profile excluding the method according to the present invention (square) and including the present invention (diamond). The level of byproducts is increased and the level is more equal. X is the radial distance from the centre of the cable.

The invention claimed is:

1. Method for preparing an HVDC cable for jointing or termination comprising the steps of:
    providing a section of an HVDC cable comprising a conductor surrounded by a first semiconducting layer, and at least one insulation layer of a first polymer material surrounding the first semiconducting layer, wherein the insulation layer comprises conductive volatile by-products;
    providing a tape of a second polymer material, wherein the tape comprises conductive volatile by-products;
    lapping the tape onto the insulation layer thereby forming an additional layer; and
    applying heat to crosslink the additional layer and redistribute the conductive volatile by-products in order to obtain a distribution wherein the conductive volatile compounds are evenly distributed in the radial direction through the insulation layer and the additional tape layer after the cable section has been subjected to heat treatment.

2. Method according to claim 1, wherein the at least one insulation layer is extruded onto the first semi-conducting layer.

3. Method according to claim 1, wherein the additional layer comprises a higher concentration of conductive volatile by-products than the at least one insulation layer.

4. Method according to claim 1, wherein the concentration of conductive volatile compounds in the radial direction of the at least one insulation layer and the at least one additional layer is equalized providing a smooth byproduct profile.

5. Method according to claim 1, wherein after heat has been applied the morphology of the additional layer is different from the morphology of the insulation layer.

6. Method according to claim 1, wherein the first polymer material and the second polymer material are the same type of polymer materiel.

7. Method according to claim 1, wherein the first polymer material and the second polymer material are selected from the group consisting of polyethylene (PE), low density polyethylene (LDPE), crosslinked polyethylene (XLPE), polypropylene, and poly(methyl meth-acrylate) (PMMA).

8. Method according to claim 1, wherein the at least one additional layer is restricted to a section of the cable and an adjacent section of the cable comprises a second semi-conducting layer surrounding the at least one insulation layer.

9. Method according to claim 1, wherein the insulation layer and the additional layer comprises a cross linking agent selected from the group consisting of dicumyl peroxide (DCP), t-butyl cumyl peroxide, di-tert-butylperoxy-isopropyl)benzene and di-tert-butyl peroxide.

* * * * *